US012494185B2

(12) United States Patent
Lee

(10) Patent No.: US 12,494,185 B2
(45) Date of Patent: Dec. 9, 2025

(54) WIRELESS TRANSMITTING DEVICE AND WIRELESS DISPLAY SYSTEM

(71) Applicant: LG ELECTRONICS INC., Seoul (KR)

(72) Inventor: Sangwon Lee, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 18/810,293

(22) Filed: Aug. 20, 2024

(65) Prior Publication Data

US 2025/0363963 A1 Nov. 27, 2025

(51) Int. Cl.
*G09G 5/10* (2006.01)
*G09G 5/00* (2006.01)

(52) U.S. Cl.
CPC ..... *G09G 5/006* (2013.01); *G09G 2320/0257* (2013.01); *G09G 2370/16* (2013.01); *G09G 2370/22* (2013.01)

(58) Field of Classification Search
CPC ........... G09G 5/006; G09G 2320/0257; G09G 2370/16; G09G 2370/22
USPC .......................................................... 345/690
See application file for complete search history.

(56) References Cited

U.S. PATENT DOCUMENTS

| | | | | |
|---|---|---|---|---|
| 2005/0275613 | A1* | 12/2005 | Woo | G09G 3/3648 345/98 |
| 2014/0092144 | A1* | 4/2014 | Kim | G09G 3/3291 345/76 |
| 2018/0302861 | A1* | 10/2018 | Zhao | H04L 67/14 |
| 2022/0028327 | A1* | 1/2022 | Bae | G09G 3/3225 |

FOREIGN PATENT DOCUMENTS

| | | |
|---|---|---|
| KR | 1020150045748 | 4/2015 |
| KR | 1020160026628 | 3/2016 |
| KR | 1020180013189 | 2/2018 |
| KR | 1020210030721 | 3/2021 |
| KR | 1020220002043 | 1/2022 |

OTHER PUBLICATIONS

PCT International Application No. PCT/KR2024/007075, International Search Report dated Feb. 21, 2025, 3 pages.

* cited by examiner

*Primary Examiner* — Jonathan M Blancha
(74) *Attorney, Agent, or Firm* — LEE, HONG, DEGERMAN, KANG & WAIMEY

(57) ABSTRACT

A wireless transmitting device according to an embodiment of the present disclosure may comprise a RF (Radio Frequency) transmitting interface configured to communicates wirelessly with a wireless receiving device and a processor configured to determine a wireless connection state between the wireless transmitting device and the wireless receiving device, and transmit, to the wireless receiving device, an afterimage compensation execution command for an afterimage compensation operation of a display of the wireless receiving device through the RF transmitting interface when the wireless connection state is determined to be a normal connection state and a usage time of the display of the wireless receiving device is more than a preset time.

15 Claims, 11 Drawing Sheets

WIRELESS TRANSMITTING DEVICE AND WIRELESS DISPLAY SYSTEM

CROSS-REFERENCE TO RELATED APPLICATION

Pursuant to 35 U.S.C. § 119, this application claims the benefit of earlier filing date and right of priority to PCT International Application No. PCT/KR2024/007075, filed on May 24, 2024, the contents of which are all incorporated by reference herein in its entirety.

TECHNICAL FIELD

This disclosure relates to a wireless display system that transmits and receives A/V data wirelessly.

BACKGROUND ART

Digital TV service using wired or wireless communication network is becoming popular. Digital TV services may provide a variety of services that cannot be provided by existing analog broadcasting service.

For example, IPTV (Internet Protocol Television) and smart TV service, which are types of digital TV service, provide interactivity that allows users to actively select the type of program to watch and the viewing time. IPTV and smart TV services may provide various additional services, such as Internet search, home shopping, and online game, based on this interactivity.

Recently, TV service is provided through a wireless system in which a wireless transmitting device transmits a compressed A/V (Audio/Video) signal to a wireless receiving device through a wireless connection, and the wireless receiving device decompresses and outputs the compressed A/V signal.

When the display of the wireless receiving device is composed of an Organic Light Emitting Diode (OLED) panel, the wireless receiving device performs an afterimage compensation algorithm function to prevent afterimage on the OLED panel.

In the case of a wireless display system, unlike general OLED display device, it consists of a wireless receiving device including an OLED panel and a wireless transmitting device responsible for video processing.

In order for the afterimage compensation algorithm function to operate normally, the command for the afterimage compensation operation between the wireless receiving device and the wireless transmitting device must be accurately transmitted and an afterimage compensation algorithm such as a pixel refresher must be executed.

However, if the wireless environment is temporarily unstable, the afterimage compensation algorithm execution command or the afterimage compensation algorithm completion confirmation command transmitted from the wireless transmitting device to the wireless receiving device may be missing, causing a problem in which the afterimage compensation algorithm is not completed properly.

If the afterimage compensation operation of the OLED display of the wireless receiving device is not performed properly, the lifespan of the OLED display is shortened.

DISCLOSURE

Technical Problem

The purpose of the present disclosure may be to enable an afterimage compensation operation of a wireless receiving device to be smoothly performed even if the wireless connection is temporarily unstable in a wireless display system.

The purpose of the present disclosure may be for a wireless transmitting device to accurately transmit a command for executing an afterimage compensation operation to a wireless receiving device even if the wireless connection is temporarily unstable in a wireless display system.

The purpose of the present disclosure may be to improve afterimage compensation operation error that occur when the wireless connection is temporarily unstable while the wireless receiving device is performing the afterimage compensation operation.

Technical Solution

A wireless transmitting device according to an embodiment of the present disclosure may comprise a RF (Radio Frequency) transmitting interface configured to communicates wirelessly with a wireless receiving device and a processor configured to determine a wireless connection state between the wireless transmitting device and the wireless receiving device, and transmit, to the wireless receiving device, an afterimage compensation execution command for an afterimage compensation operation of a display of the wireless receiving device through the RF transmitting interface when the wireless connection state is determined to be a normal connection state and a usage time of the display of the wireless receiving device is more than a preset time.

A wireless display system including a wireless transmitting device and a wireless receiving device according to an embodiment of the present disclosure, wherein the wireless transmitting device is configured to determine a wireless connection state between the wireless transmitting device and the wireless receiving device, and transmit, to the wireless receiving device, an afterimage compensation execution command for an afterimage compensation operation of a display of the wireless receiving device through the RF transmitting interface when the wireless connection state is determined to be a normal connection state and a usage time of the display of the wireless receiving device is more than a preset time, wherein the wireless receiving device is configured to transmit an afterimage compensation start notification to the wireless transmitting device in response to the afterimage compensation execution command.

Advantageous Effects

According to an embodiment of the present disclosure, the performance of the afterimage prevention operation may be secured even if the temporary wireless environment of the wireless display system does not allow smooth transmission of unstable commands.

According to an embodiment of the present disclosure, before performing an afterimage compensation operation, the wireless connection state between the wireless transmitting device 100 and the wireless receiving device 200 may be confirmed in advance, and only when the wireless connection state is a normal connection state, afterimage compensation execution command may be transmitted to the wireless receiving device 200. Accordingly, even if the wireless connection state becomes temporarily unstable, transmission of the afterimage compensation execution command may be prevented from being missed.

According to an embodiment of the present disclosure, while performing an afterimage compensation operation, the wireless connection state between the wireless transmitting device 100 and the wireless receiving device 200 may be confirmed in advance, and only when the wireless connection state is a normal connection state, a command to confirm completion of afterimage compensation may be transmitted to the wireless receiving device 200. Accordingly, even if the wireless connection state becomes temporarily unstable, the transmission of the afterimage compensation confirmation command may not be missed. Additionally, redundant performance of the afterimage compensation operation, which may occur due to missing transmission of the afterimage compensation confirmation command, may be prevented.

BEST MODE

The wireless transmitting device according to an embodiment of the present disclosure is, for example, an intelligent device that adds a computer support function to the broadcast reception function, and is faithful to the broadcast reception function while adding an Internet function, etc., and it may be equipped with a more convenient interface such as a handwriting input device, a touch screen or a spatial remote control.

The wireless transmitting device may be connected to the Internet and a computer by supporting wired or wireless Internet function and may perform function such as email, web browsing, banking, or gaming. A standardized general-purpose OS may be used for these various functions.

Accordingly, in the wireless transmitting device described in the present disclosure, for example, various applications may be freely added or deleted on a general-purpose OS kernel, so various user-friendly functions may be performed.

Figure 1:
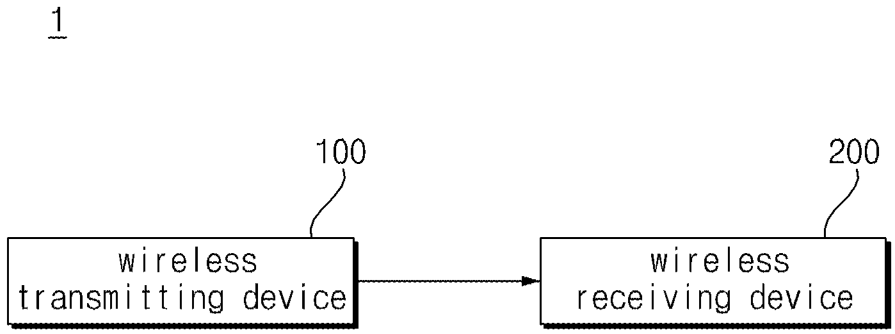
FIGS. 1 to 2 are diagrams illustrating the configuration of a display system according to an embodiment of the present disclosure.
Figure 2:
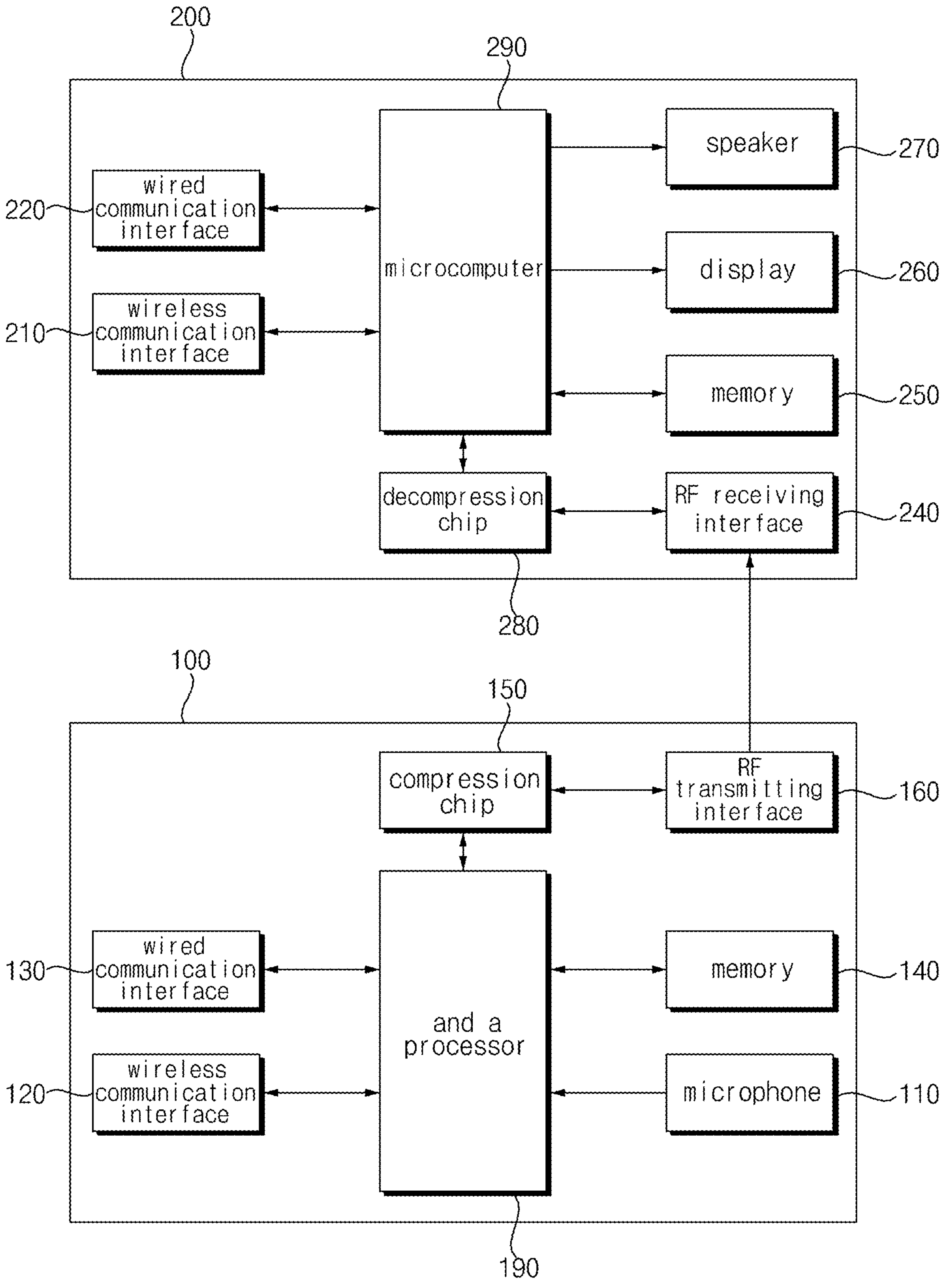

FIGS. 1 to 2 are diagrams illustrating the configuration of a wireless display system according to an embodiment of the present disclosure.

Referring to FIG. 1, a wireless display system 1 according to an embodiment of the present disclosure may include a wireless transmitting device 100 and a wireless receiving device 200.

The wireless display system 1 may be a system in which the wireless transmitting device 100 wirelessly transmits A/V data to the wireless receiving device 200, and the wireless receiving device 200 outputs the A/V data.

The wireless transmitting device 100 may be a device that encodes video and audio and transmits the encoded video and audio wirelessly.

The wireless transmitting device 100 may be a set-top box.

The wireless transmitting device 100 may be connected to an external device such as a set-top box or USB memory. The wireless transmitting device 100 may transmit a video signal or an audio signal received from a connected external device to the wireless receiving device 200.

The wireless receiving device 200 may be a display device capable of wirelessly receiving encoded video and audio and decoding the received video and audio.

The wireless transmitting device 100 and the wireless receiving device 200 may configure a video wall display system.

In a video wall, having a display with thin bezel plays an important role in the visualization of content video. In order to achieve a thin bezel of the display, it is efficient to have only the elements that play the minimum role, and to have the circuits and elements for the main functions performed in a separate device.

The wireless transmitting device 100 may determine the compression ratio of the video based on either the type of video input from the outside or the quality of communication between the wireless transmitting device 100 and the wireless receiving device 200.

The compression ratio of video may be defined as the ratio of the size of the video data before encoding and the size of the video data after encoding.

The type of video may be one of a still video type, a general video type, or a game video type.

The wireless transmitting device 100 may compress the video according to the determined compression ratio and wirelessly transmit the compressed video to the wireless receiving device 200.

The wireless receiving device 200 may restore compressed video received from the wireless transmitting device 100 and display the restored video on a display.

FIG. 2 is a block diagram illustrating the detailed configuration of the wireless transmitting device 100 and the wireless receiving device 200.

Referring to FIG. 2, the wireless transmitting device 100 may include a microphone 110, a wireless communication interface 120, a wired communication interface 130, a memory 140, a compression chip 150, an RF transmitting interface 160, and a processor 190.

The microphone 110 may receive an audio signal and transmit it to the processor 190.

The microphone 110 may receive a voice uttered by a user.

The wireless communication interface 120 may include one or more of a Wi-Fi circuit and a Bluetooth circuit.

The Wi-Fi circuit may perform wireless communication with an external device or the wireless receiving device 200 through the Wi-Fi standard.

The Bluetooth circuit may perform wireless communication through the Bluetooth Low Energy (BLE) standard.

The Bluetooth circuit may perform wireless communication with an external device such as a remote control or the wireless receiving device 200 through the Bluetooth Low Energy (BLE) standard.

The wireless communication interface 120 may include a tuner that receives broadcast signals.

The wired communication interface 130 may be an interface for a wired connection with an external device. The wired communication interface 130 may include a plurality of High Definition Multimedia Interface (HDMI) terminals or Universal Serial Bus (USB) ports.

The wired communication interface 130 may receive video signal or audio signal from external devices.

The memory 140 may store programs for signal processing and control, and store signal-processed video, voice, or data signal.

The memory 140 may perform a function for temporary storage of video, voice, or data signals input from the outside, and may also store information about a certain image through a channel memory function.

The compression chip 150 may compress a video signal or audio signal input from the outside and transmit the compressed signal to the RF transmitting interface 160.

The compression chip 150 may include an encoder for compressing a video signal or an audio signal.

The RF transmitting interface 160 may transmit an A/V signal to the RF receiving interface 240 of the wireless receiving device 200 through RF (Radio Frequency) communication.

RF transmit interface 160 may include one or more transmitting antennas.

The RF transmitting interface 160 may transmit compressed A/V signal in digital form to the RF receiving interface 240.

The RF transmitting interface 160 may transmit an A/V signal to the RF receiving interface 240 through one or more channels.

The processor 190 may generally control the operation of the wireless transmitting device 100. The processor 190 may be named Main System on Chip (Main SoC).

The processor 190 may also include a compression chip 150.

The wireless receiving device 200 may include a wireless communication interface 210, a wired communication interface 220, an RF receiving interface 240, a memory 250, a display 260, a speaker 270, a decompression chip 280, and a micom (microcomputer, 290).

The wireless communication interface 210 may include a Wi-Fi circuit, a Bluetooth circuit, and an IR circuit.

The Wi-Fi circuit may perform wireless communication through the Wi-Fi standard.

The Wi-Fi circuit may perform wireless communication with an external device or the wireless transmitting device 100 through the Wi-Fi standard.

The Bluetooth circuit may perform wireless communication through the Bluetooth Low Energy (BLE) standard.

The Bluetooth circuit may perform wireless communication with an external device such as a remote control or the wireless transmitting device 100 through the Bluetooth Low Energy (BLE) standard.

The IR circuit may receive a signal from the remote control 300, which will be described later, through IR (Infrared) communication.

The wired communication interface 220 may be an interface for a wired connection with an external device. The wired communication interface 220 may include a plurality of High Definition Multimedia Interface (HDMI) terminals or Universal Serial Bus (USB) ports.

The wired communication interface 220 may receive video signals or audio signals from external devices.

The RF receiving interface 240 may receive a compressed A/V signal from the RF transmitting interface 160.

RF receiving interface 240 may include one or more receive antennas. The RF receiving interface 240 may be placed at the bottom of the display 260.

The RF receiving interface 240 may receive a compressed A/V signal in digital form from the RF transmitting interface 160 and transmit the received A/V signal to the decompression chip 280.

The memory 250 may store programs for signal processing and control, and store signal-processed video, voice, or data signal.

The display 260 may display a video signal received from the microcomputer 290.

The display 260 may display a video signal according to the driving of a timing controller (not shown).

The decompression chip 280 may decompress the compressed A/V signal received by the RF receiving interface 240. The decompression chip 280 may include a decoder and may restore the compressed A/V signal through the decoder.

A microcomputer (microcomputer) 290 may control the overall operation of the wireless receiving device 200.

The microcomputer 290 may output a decompressed video signal through the display 260 and a decompressed audio signal through the speaker 270.

Figure 3:
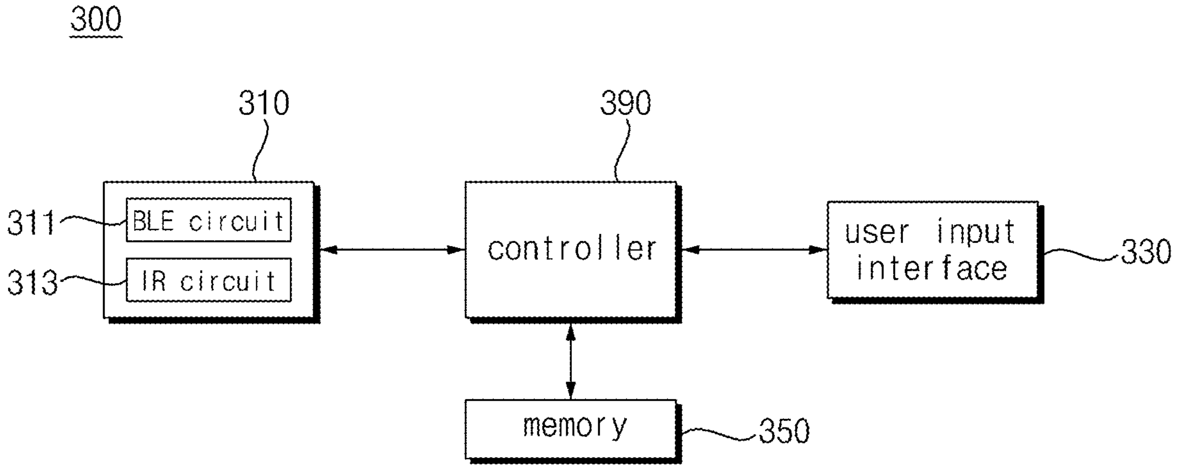
FIG. 3 is a block diagram illustrating the configuration of a remote control device according to an embodiment of the present disclosure.

FIG. 3 is a block diagram illustrating the configuration of a remote control device according to an embodiment of the present disclosure.

Referring to FIG. 3, the remote control device 300 may include a wireless communication interface 310, a user input interface 330, a memory 350, and a controller 390.

The wireless communication interface 310 may be an interface for performing wireless communication with the wireless transmitting device 100 or the wireless receiving device 200.

The wireless communication interface 310 may include a Bluetooth Low Energy (BLE) circuit 311 and an InfraRed (IR) circuit 313.

The BLE circuit 311 may transmit a signal for controlling the operation of the wireless transmitting device 100 to the wireless transmitting device 100.

The BLE circuit 311 may transmit a signal that triggers a pairing operation of the wireless transmitting device 100 to the wireless transmitting device 100.

The IR circuit 313 may transmit an IR signal for controlling the operation of the wireless transmitting device 100 or the wireless receiving device 200 to the wireless transmitting device 100.

The user input interface 330 may be comprised of a keypad, button, touch pad, or touch screen.

The user input interface 330 may generate control command for controlling the operation of the wireless transmitting device 100 or the wireless receiving device 200 according to the user's operation command.

If the user input interface 330 is provided with a hard key button, the user may operate the hard key through a push operation of the hard key button.

The user input interface 330 may include various types of input means that the user may operate, such as a scroll key and a jog key.

The memory 350 may store programs for operating the controller 390, and may also temporarily store input/output data.

The controller 390 controls operations related to application programs and generally controls the overall operation of the remote control device 300.

Figure 4A:
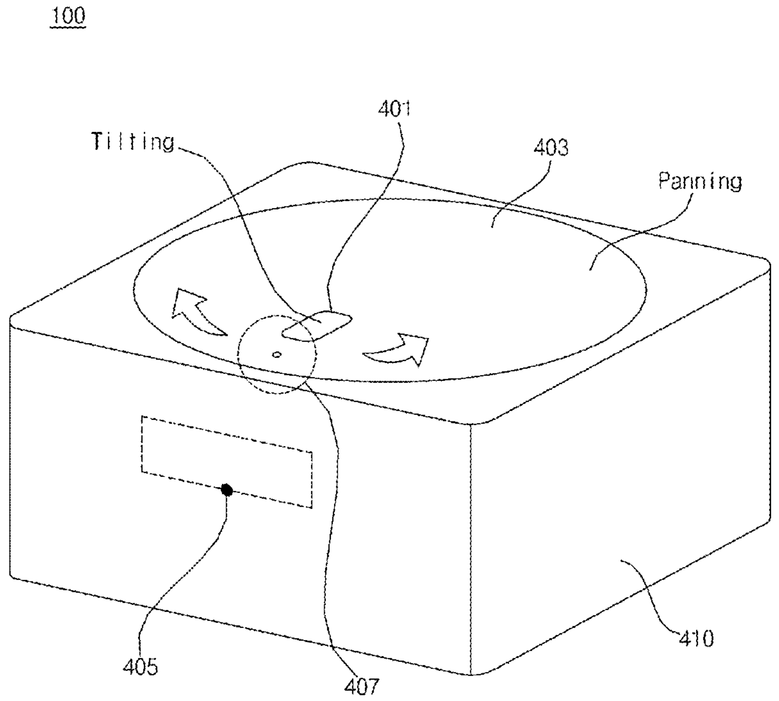
FIG. 4A is a perspective view of a wireless transmitting device.
Figure 4B:
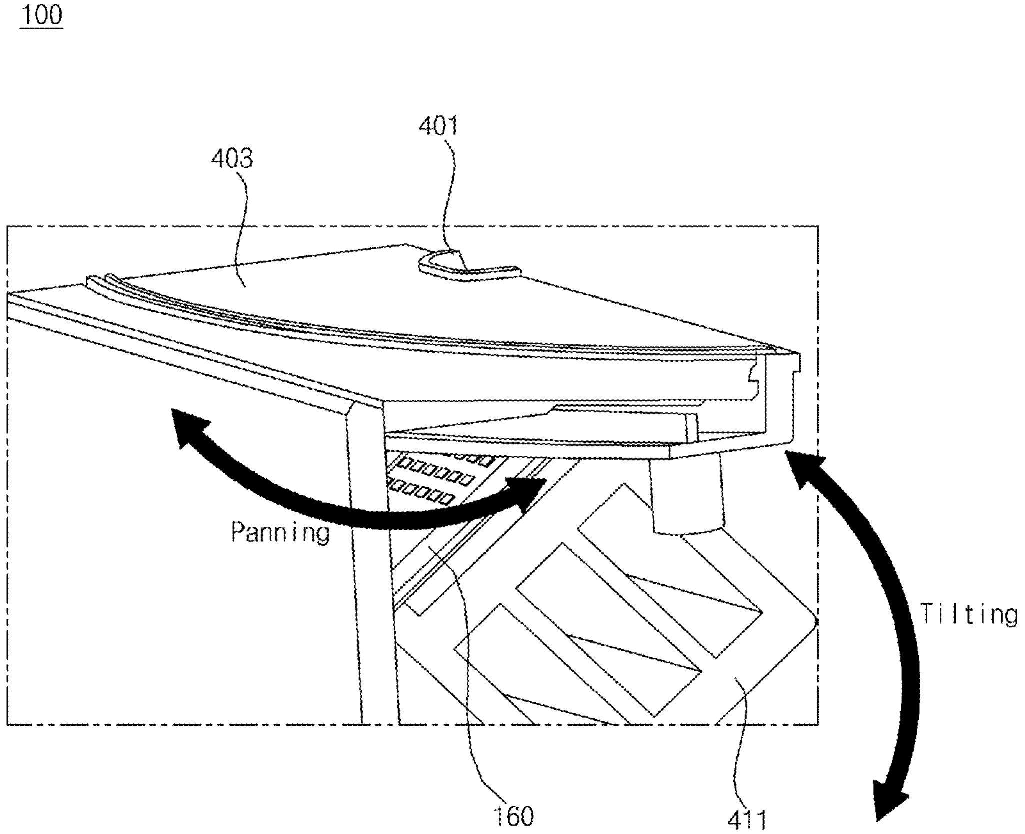
FIG. 4B is a diagram illustrating the internal structure of a wireless transmitting device.
Figure 4C:
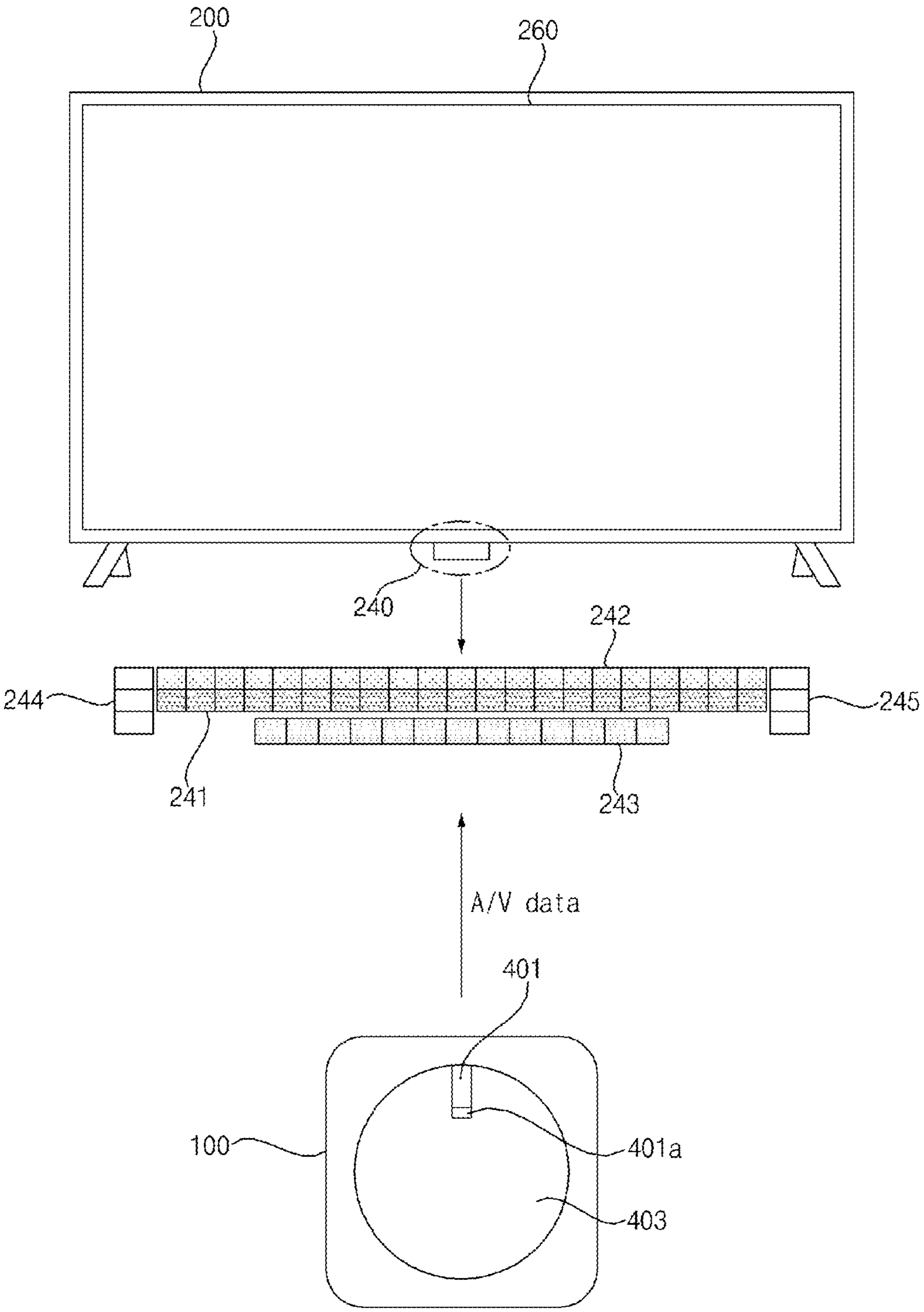
FIG. 4C is a diagram illustrating the RF receiving interface of the wireless receiving device.

FIG. 4A is a perspective view of a wireless transmitting device, FIG. 4B is a diagram illustrating the internal structure of the wireless transmitting device, and FIG. 4C is a diagram illustrating an RF receiving interface of the wireless receiving device.

Referring to FIG. 4A, the wireless transmitting device 100 may include a box 410, a sliding button housing 401 that accommodates a sliding button 401*a*, a dial 403, a power status indicator 405, and a communication quality status indicator (407).

The inside of the box 410 may include elements of the wireless transmitting device 100 described in FIG. 2. Box 410 may be a housing that may accommodate elements of the wireless transmitting device 100 described in FIG. 2.

The sliding button 401*a* may be a means for controlling the vertical direction (tilting control) of the RF transmitting interface 160 shown in FIG. 4B.

The dial 403 may be a means for controlling the horizontal rotation direction (panning control) of the RF transmitting interface 160 shown in FIG. 4B.

The power status indicator 405 may indicate the power on or off state of the wireless transmitting device 100. The power status indicator 405 may include one or more LEDs.

The communication quality status indicator 407 may indicate the communication quality status between the wireless transmitting device 100 and the wireless receiving device 200. Communication quality status indicator 407 may include one or more LEDs.

The communication quality status indicator 407 is an optional configuration and may not be provided in the box 410.

The processor 190 may receive a pointing correction input through the sliding button 401*a* or the dial 403.

The processor 190 may tilt the RF transmitting interface 160 including the transmitting antennas in the vertical direction according to the input of moving the sliding button 401*a*.

The RF transmitting interface 160 may include a substrate and a plurality of transmitting antennas. The RF transmitting interface 160 may be provided on the top of the heat sink 611 to release heat generated inside the box 410.

The processor 190 may rotate or pan the RF transmitting interface 160 including the transmitting antennas in the left and right directions according to the input of moving the dial 403.

The user may perform antenna pointing correction by manipulating the sliding button 401*a* or the dial 403.

Referring to FIG. 4C, an RF receiving interface 240 may be provided at the bottom of the display 260 of the wireless receiving device 200.

RF receiving interface 240 may include a board and a plurality of receiving antennas mounted on the board, and receive A/V data from the wireless transmitting device 100.

The RF receiving interface 240 may be placed at the bottom center of the display 260. The RF receiving interface 240 may be placed in a separate housing, and the housing may be placed at the bottom center of the display 260.

The RF receiving interface 240 may includes a front antenna array 241, an upper antenna array 242 disposed above the front antenna array 241, a lower antenna array 243 disposed below the front antenna array 241, a right antenna array 244 disposed on the right side of the front antenna array 241 and a left antenna array 245 disposed on the left side of the front antenna array 241.

In one embodiment, each of the front antenna array 241, the upper antenna array 242, the lower antenna array 243, the right antenna array 244, and the left antenna array 245 may include a plurality of receiving antennas.

In one embodiment, the receiving antennas included in each of the front antenna array 241, the upper antenna array 242, the lower antenna array 243, the right antenna array 244, and the left antenna array 245 may be arranged to all face the same direction.

In another embodiment, each of the front antenna array 241, the upper antenna array 242, the lower antenna array 243, the right antenna array 244, and the left antenna array 245 may be arranged to face different direction.

Figure 5A:
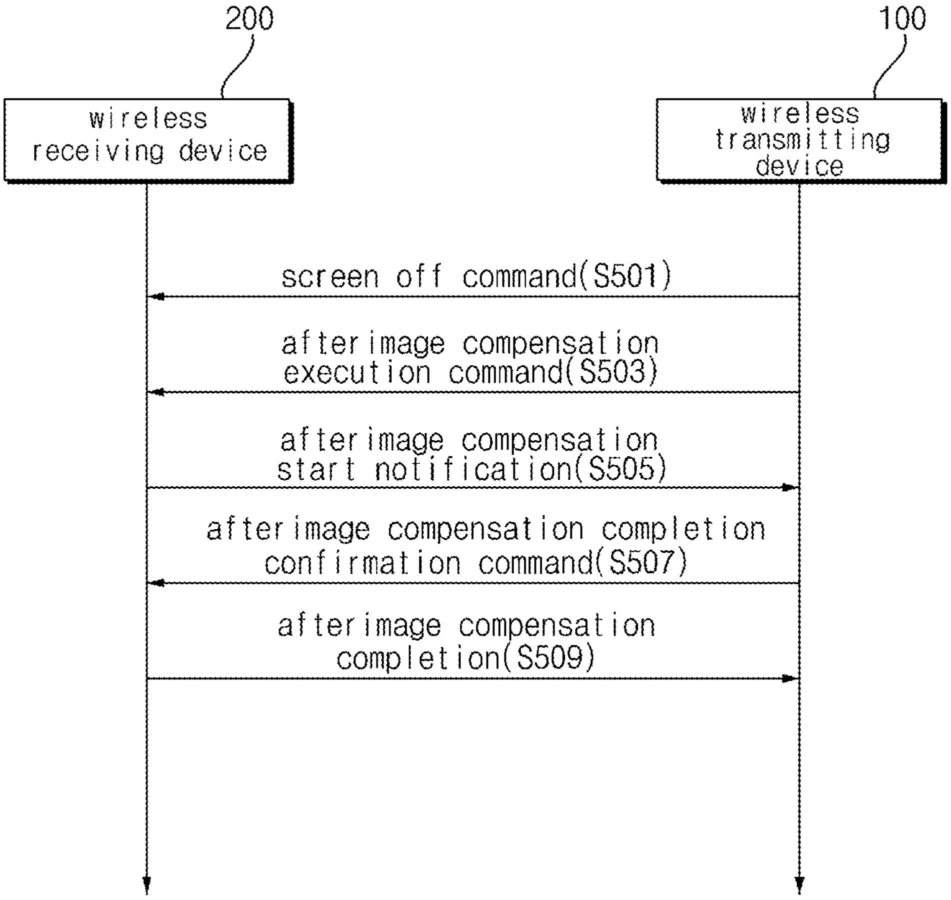
FIGS. 5A to 5C are diagrams illustrating a process in which an error in an afterimage compensation operation occurs when the wireless connection between a wireless transmitting device and a wireless receiving device is unstable according to the prior art.
Figure 5B:
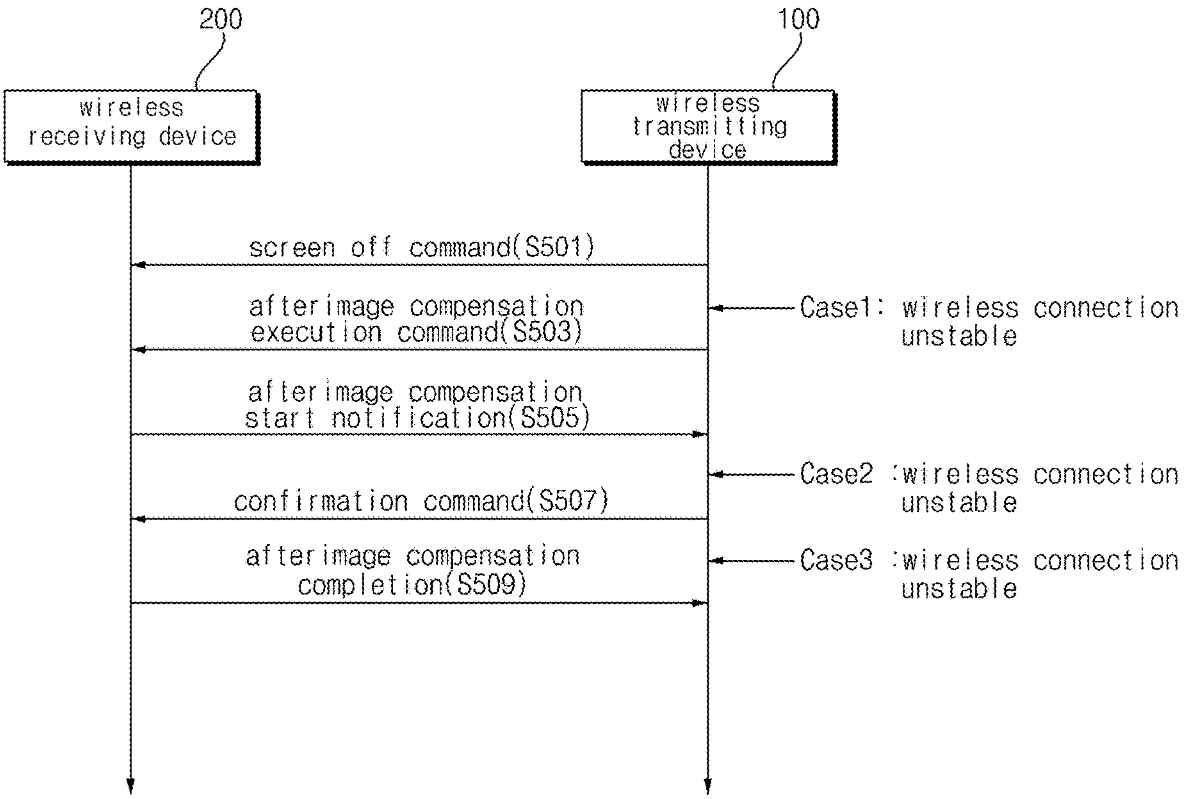
Figure 5C:
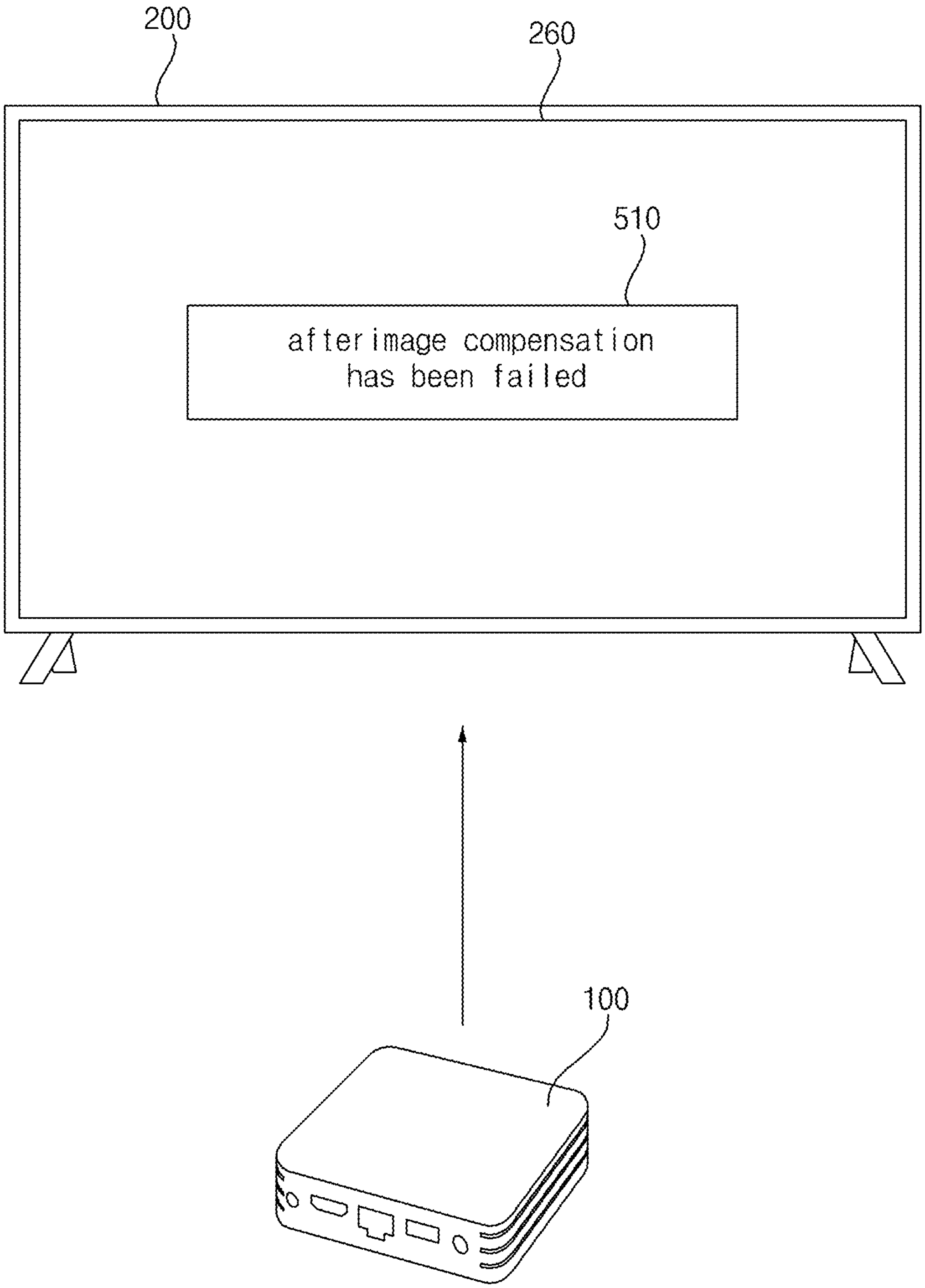

FIGS. 5A to 5C are diagrams illustrating a process in which an error in an afterimage compensation operation occurs when the wireless connection between a wireless transmitting device and a wireless receiving device is unstable according to the prior art.

FIG. 5A is a diagram illustrating a sequence in which a wireless display system performs an afterimage compensation operation according to the prior art.

The wireless display system performs an afterimage compensation operation according to the following sequence.

Referring to FIG. 5A, the wireless transmitting device 100 transmits a screen off command to the wireless receiving device 200 (S501).

When the usage time of the display 260 of the wireless receiving device 200 is more than a certain time, the wireless transmitting device 100 transmits an afterimage compensation execution command to the wireless receiving device 200 to execute the afterimage compensation operation (S503).

The wireless receiving device 200 performs an afterimage compensation operation according to the received afterimage compensation execution command.

The wireless receiving device 200 transmits an afterimage compensation start notification informing the execution of the afterimage compensation operation to the wireless transmitting device 100 in response to the afterimage compensation execution command (S505).

After a preset time has elapsed, the wireless transmitting device 100 transmits an afterimage compensation completion confirmation command to the wireless receiving device 200 to inquire whether the afterimage compensation operation has been completed (S507).

When the afterimage compensation operation is completed, the wireless receiving device 200 transmits an afterimage compensation completion notification indicating that the afterimage compensation operation has been completed to the wireless transmitting device 100 in response to the afterimage compensation completion confirmation command (S509).

FIG. 5A is a typical sequence in which a wireless display system performs an afterimage compensation operation. However, if an obstacle exists between the wireless transmitting device 100 and the wireless receiving device 200 or the wireless environment is not good, a problem occurs in which a command transmitted by the wireless transmitting device 100 to the wireless receiving device 200 or a notification transmitted from the wireless receiving device 200 to the wireless transmitting device 100 is not accurately delivered.

FIG. 5B is a diagram illustrating cases in which the wireless connection may be unstable in the sequence of FIG. 5A.

CASE 1 may be a case where the wireless connection between the wireless transmitting device 100 and the wireless receiving device 200 becomes temporarily unstable before the wireless transmitting device 100 transmits an afterimage compensation execution command to the wireless receiving device 200.

CASE 2 may be a case where the wireless connection between the wireless transmitting device 100 and the wireless receiving device 200 becomes temporarily unstable during the afterimage compensation operation.

CASE 3 may be a case where the wireless connection between the wireless transmitting device 100 and the wireless receiving device 200 is temporarily unstable after the wireless transmitting device 100 transmits an afterimage compensation completion confirmation command to the wireless receiving device 200.

First, the problem that arises in CASE 1 is explained.

Referring to FIG. 5B, when the usage time of the display 260 of the wireless receiving device 200 is more than the certain time, the wireless transmitting device 100 must send an afterimage compensation execution command to the wireless receiving device 200 to perform the afterimage compensation operation.

However, before the wireless transmitting device 100 transmits the afterimage compensation execution command, the wireless connection between the wireless transmitting device 100 and the wireless receiving device 200 may become temporarily unstable (CASE 1). In this case, even if the wireless transmitting device 100 transmits the afterimage compensation execution command, the wireless receiving device 200 cannot receive the afterimage compensation execution command.

Since the wireless receiving device 200 did not receive the afterimage compensation execution command, it does not perform the afterimage compensation operation. Accordingly, when the display 260 of the wireless receiving device 200 is turned on, the wireless transmitting device 100 transmits a control command to the wireless receiving device 200 so that an afterimage compensation failure notification 510 as shown in FIG. 5C is displayed.

Next, the problems that arise in the situation of CASE 2 are explained.

In CASE 2, the wireless receiving device 200 receives the afterimage compensation execution command from the wireless transmitting device 100 and normally performs the afterimage compensation operation. After a preset time has elapsed, the wireless transmitting device 100 transmits a command to confirm completion of afterimage compensation to the wireless receiving device 200. However, since the wireless connection is unstable, the wireless receiving device 200 does not receive the command to confirm the completion of afterimage compensation, and does not transmit a completion notification of afterimage compensation to the wireless transmitting device 100.

Since the wireless transmitting device 100 does not receive the completion notification of of afterimage compensation from the wireless receiving device 200 after the lapse of the preset time indicating the performance period of afterimage compensation, the wireless transmitting device 100 transmit a command to re-perform the afterimage compensation operation to the wireless receiving device 200. Even though the wireless receiving device 200 has already performed the afterimage compensation operation, an unnecessary operation of re-performing the afterimage compensation operation may occur. In addition, the wireless transmitting device 100 may transmit a control command to the wireless receiving device 200 so that an afterimage compensation failure notification 510 as shown in FIG. 5C is displayed after the preset time indicating the performance period of afterimage compensation has elapsed.

Next, the problems that arise in the situation of CASE 3 are explained.

The wireless transmitting device 100 transmits a command to confirm completion of afterimage compensation to the wireless receiving device 200. The wireless receiving device 200 outputs the completion notification of the afterimage compensation in response to the afterimage compensation completion confirmation command. However, since the wireless connection is unstable, the completion notification of afterimage compensation cannot be delivered to the wireless transmitting device 100.

Since the wireless transmitting device 100 has not received the completion notification of the afterimage compensation from the wireless receiving device 200, it determines that the afterimage compensation operation has not been completed.

The wireless transmitting device 100 may transmit a control command to the wireless receiving device 200 so that an afterimage compensation failure notification 510 as shown in FIG. 5C is displayed.

As such, according to the prior art, as the wireless environment temporarily becomes poor, a problem occurs in which the afterimage compensation operation is not performed or the afterimage compensation operation is performed redundantly.

The present disclosure provides a method to prevent errors in afterimage compensation operations from occurring even if the wireless environment is temporarily unstable.

Figure 6A:
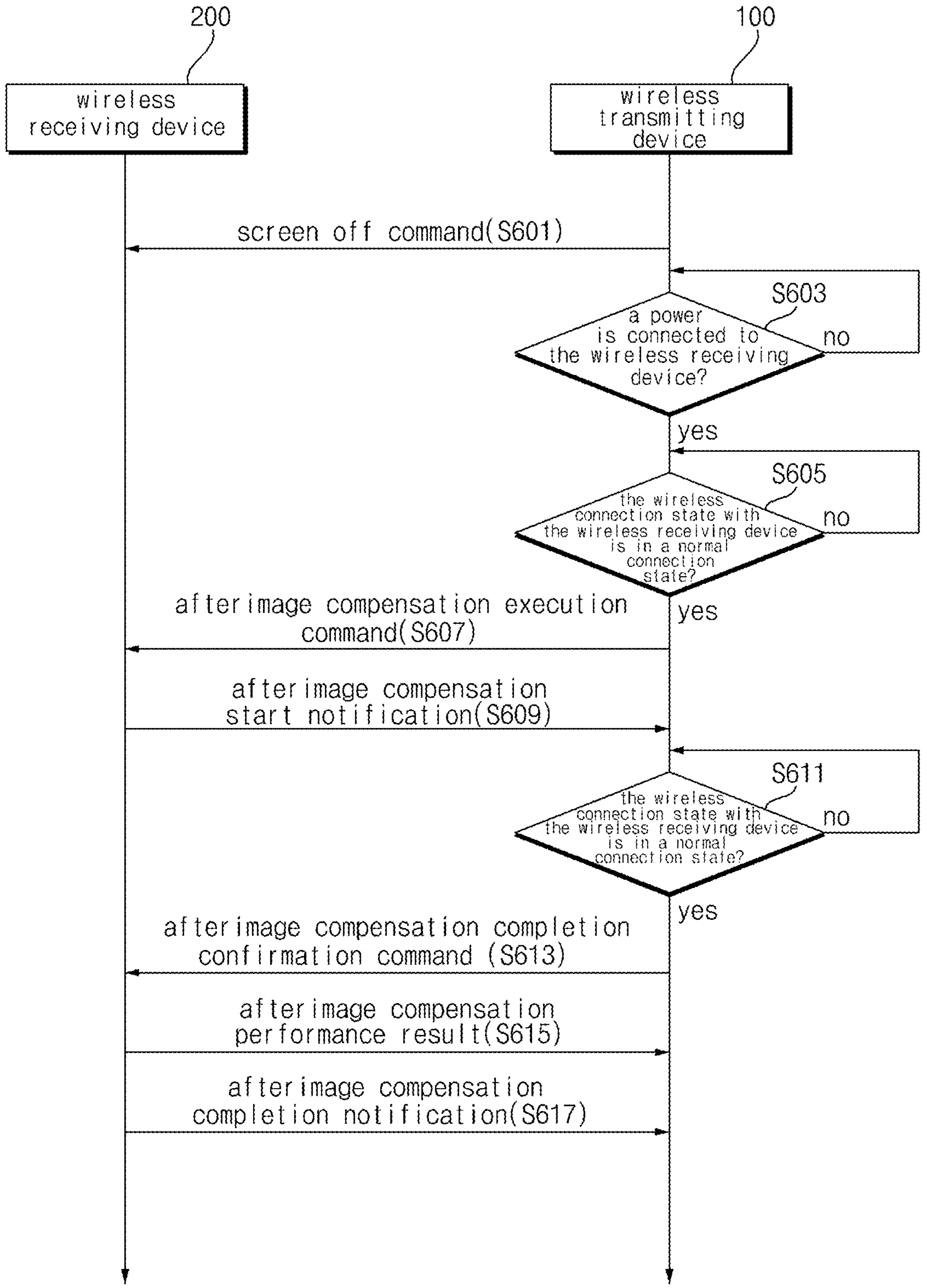
FIG. 6A is a sequence diagram illustrating a method of operating a wireless display system according to an embodiment of the present disclosure.

FIG. 6A is a sequence diagram illustrating a method of operating a wireless display system according to an embodiment of the present disclosure.

Referring to FIG. 6A, the processor 190 of the wireless transmitting device 100 may transmit a screen off command to the wireless receiving device 200 (S601).

The processor 190 may receive a screen-off signal from the remote control device 300 that turns off the display 260 of the wireless receiving device 200. The processor 190 may transmit the screen-off command to the wireless receiving device 200 in response to the screen-off signal.

The processor 190 may transmit the screen-off command to the wireless receiving device 200 using either a Bluetooth circuit or an IR circuit provided in the wireless communication interface 120.

The microcomputer 290 of the wireless receiving device 200 may turn off the screen of the display 260 according to a screen off command received from the wireless transmitting device 100.

The processor 190 of the wireless transmitting device 100 may determine whether a power is connected to the wireless receiving device 200 (S603).

The processor 190 may detect the power connection status of the wireless receiving device 200. The processor 190 may request power connection status information of the wireless receiving device 200 from the wireless receiving device 200 through either a Bluetooth circuit or an IR circuit provided in the wireless communication interface 120. The processor 190 may receive power connection status information from the wireless receiving device 200 in response to the request.

Power connection status information may include information about whether power is connected to the wireless receiving device 200 and whether the display 260 is turned on/off.

When it is determined that power is connected to the wireless receiving device 200, the processor 190 of the wireless transmitting device 100 may determine whether the wireless connection state with the wireless receiving device 200 is in a normal connection state (S605).

The wireless connection state between the wireless transmitting device 100 and the wireless receiving device 200 may include a normal connection state and a unstable state.

The normal connection state may be a state in which wireless communication is normally performed between the RF transmitting interface 160 of the wireless transmitting device 100 and the RF receiving interface 240 of the wireless receiving device 200.

In one embodiment, the processor 190 may determine the wireless connection state by measuring a value of a communication quality index between the RF transmitting interface 160 of the wireless transmitting device 100 and the RF receiving interface 240 of the wireless receiving device 200. If the value of the communication quality indicator is greater than or equal to a preset value, the processor 190 may determine the wireless connection state as the normal connection state, and if the value of the communication quality indicator is less than the preset value, the processor 190 may determine the wireless connection state as the unstable state.

In another embodiment, the processor 190 may determine the wireless connection state as the normal connection state when the communication quality state between the RF transmitting interface 160 of the wireless transmitting device 100 and the RF receiving interface 240 of the wireless receiving device 200 is not a disconnection state.

Communication quality state may be classified into a good state, a normal state, a weak state, and a disconnection state according to communication quality indicator.

The communication quality indicator may be either a Signal to Noise Ratio (SNR) or a Received Signal Strength Indicator (RSSI).

When the processor 190 of the wireless transmitting device 100 is in the normal connection state with the wireless receiving device 200, it may transmit an afterimage compensation execution command to the wireless receiving device 200 (S607).

The processor 190 is in the normal connection state with the wireless receiving device 200, and when the usage time of the display 260 is more than a preset time, the processor 190 may transmit an afterimage compensation execution command to the wireless receiving device 200 to execute the afterimage compensation operation.

The processor 190 may count the usage time of the display 260. The processor 190 may obtain the time when the screen of the display 260 is on as the usage time of the display 260.

In one embodiment, the processor 190 may receive the usage time of the display 260 from the wireless receiving device 200.

In another embodiment, the processor 190 may count the time of the display 260 from transmitting the screen-on command to the wireless receiving device 200 to transmitting the screen-off command to the wireless receiving device 200 to obtain the usage time.

In one embodiment, the processor 190 may transmit, to the wireless receiving device 200, a first afterimage compensation execution command for executing a first afterimage compensation operation when the wireless transmitting device 200 is is in the normal connection state with the wireless receiving device 200, and the usage time of the display 260 is more than a preset first time. The preset first time may be 4 hours, but this is only an example.

The first afterimage compensation execution command may be a command to perform the first afterimage compensation operation using the first afterimage compensation algorithm. The first afterimage compensation algorithm may be a method for compensating for a deviation of a threshold voltage (Vth) of the TFT (Thin Film Transistor) device by sensing an increase or decrease in the current flowing through the OLED device compared to the characteristic of the TFT device provided in the OLED panel of the display 260.

The first afterimage compensation operation may be set to be performed during a first compensation time.

In another embodiment, the processor 190 may transmit, to the wireless receiving device 200, a second afterimage compensation execution command for executing a second afterimage compensation operation when the wireless transmitting device 200 is is in the normal connection state with the wireless receiving device 200, and the usage time of the display 260 is more than a preset second time. The preset second time may be 2000 hours, but this is only an example.

The second afterimage compensation execution command may be a command to perform a second afterimage compensation operation using a second afterimage compensation algorithm. The second afterimage compensation algorithm may be a method of detecting deviation in deterioration of OLED element provided in the OLED panel of the display 260 to remove a luminance and a color deviation.

The second afterimage compensation operation may be set to be performed during a second compensation time.

The microcomputer 290 of the wireless receiving device 200 may turn on (or activate) the screen of the display 260 according to an afterimage compensation execution command to perform an afterimage compensation operation.

The processor 190 may transmit the afterimage compensation execution command to the RF receiving interface 240 of the wireless receiving device 200 through the RF transmitting interface 160.

Meanwhile, if the wireless connection state with the wireless receiving device 200 is in a unstable state, the processor 190 may not transmit the afterimage compensation execution command to the wireless receiving device 200.

If the wireless connection with the wireless receiving device 200 is in the unstable state, the processor 190 may wait for a certain time to prevent the transmission of the afterimage compensation execution command from being missed. After waiting for the certain time, the processor 190 may re-check the wireless connection state with the wireless receiving device 200.

If the wireless connection state with the wireless receiving device 200 is converted to the normal connection state as a result of re-checking the wireless connection state, the processor 190 may transmit the afterimage compensation execution command to the wireless receiving device 200.

As such, according to an embodiment of the present disclosure, before performing the afterimage compensation operation, the wireless connection state between the wireless transmitting device 100 and the wireless receiving device 200 may be confirmed in advance, and only when the wireless connection state is the normal connection state, the afterimage compensation execution command may be transmitted to the wireless receiving device 200.

Accordingly, even if the wireless connection state becomes temporarily in the unstable state, transmission of the afterimage compensation execution command may be prevented from being missed.

The processor 190 of the wireless transmitting device 100 may receive an afterimage compensation start notification in response to the afterimage compensation execution command (S609).

The microcomputer 290 of the wireless receiving device 200 may perform an afterimage compensation operation in response to the afterimage compensation execution command, and transmit an afterimage compensation start notification to the wireless transmitting device 100 indicating that the afterimage compensation operation of the display 260 has started.

The microcomputer 290 may transmit the afterimage compensation start notification to the RF transmitting interface 160 of the wireless transmitting device 100 through the RF receiving interface 240.

The processor 190 of the wireless transmitting device 100 may count a execution time of the afterimage compensation operation upon receiving the received afterimage compensation start notification. The processor 190 may count the execution time of the afterimage compensation operation from the time of receiving the afterimage compensation start notification.

The processor 190 of the wireless transmitting device 100 may determine whether the wireless connection state with the wireless receiving device 200 is the normal connection state (S611).

The processor 190 may determine whether the wireless connection state with the wireless receiving device 200 is the normal connection state during the afterimage compensation operation of the display 260.

In one embodiment, the processor 190 may re-check the wireless connection state before transmitting a command to confirm completion of afterimage compensation.

In another embodiment, when the execution time of the afterimage compensation operation reaches the first compensation time or the second compensation time, the processor 190 may re-check the wireless connection state before transmitting the afterimage compensation completion confirmation command.

The memory 140 of the wireless transmitting device 100 may store a first compensation time corresponding to the first afterimage compensation algorithm and a second compensation time corresponding to the second afterimage compensation algorithm. The processor 190 may determine whether the execution time of the afterimage compensation operation reaches the first compensation time or the second compensation time stored in the memory 140.

When the processor 190 of the wireless transmitting device 100 is in the normal connection state with the wireless receiving device 200, it may transmit an afterimage compensation completion confirmation command to the wireless receiving device 200 (S613).

When the wireless connection state with the wireless receiving device 200 is in the normal connection state, the processor 190 may transmit the afterimage compensation completion confirmation command to the wireless receiving device 200 to check whether the afterimage compensation operation is completed.

The processor 190 may transmit the afterimage compensation completion confirmation command to the RF receiving interface 240 of the wireless receiving device 200 through the RF transmitting interface 160.

If the wireless connection state with the wireless receiving device 200 is the unstable state, the processor 190 may not transmit the afterimage compensation completion confirmation command to the wireless receiving device 200.

If the wireless connection state with the wireless receiving device 200 is the unstable state, the processor 190 may wait for a certain time to prevent the transmission of the afterimage compensation completion confirmation command from being missed. After waiting for the certain time, the processor 190 may re-check the wireless connection state with the wireless receiving device 200.

If the wireless connection state with the wireless receiving device 200 is converted to the normal connection state as a result of re-checking the wireless connection state, the processor 190 may transmit the afterimage compensation completion confirmation command to the wireless receiving device 200.

The processor 190 of the wireless transmitting device 100 may receive an afterimage compensation performance result from the wireless receiving device 200 in response to the afterimage compensation completion confirmation command (S615).

The afterimage compensation performance result may include one or more of whether the afterimage compensation operation of the display 260 is completed or an actual performance time at which the afterimage compensation operation of the display 260 is actually performed.

The wireless receiving device 200 may perform the afterimage compensation operation according to an afterimage compensation execution command, and thereafter, may perform the afterimage compensation operation normally even if the wireless connection state is in the unstable state. The wireless receiving device 200 may store the result of performing the afterimage compensation operation, and when the wireless connection state is converted to the normal connection state, the wireless receiving device 200 may transmit the afterimage compensation performance result to the wireless transmitting device 100.

As such, according to an embodiment of the present disclosure, while performing the afterimage compensation operation, the wireless connection state between the wireless transmitting device 100 and the wireless receiving device 200 may be confirmed in advance, and only when the wireless connection state is the normal connection state, the afterimage compensation completion confirmation command may be transmitted to the wireless receiving device 200.

Accordingly, even if the wireless connection state becomes temporarily unstable, the transmission of the afterimage compensation completion confirmation command may not be missed. Additionally, redundant performance of the afterimage compensation operation, which may occur due to missing transmission of the afterimage compensation completion confirmation command, may be prevented.

The processor 190 of the wireless transmitting device 100 may receive an afterimage compensation completion notification of from the wireless receiving device 200 (S617).

When the afterimage compensation operation is completed, the wireless receiving device 200 may transmit the afterimage compensation completion notification to the wireless transmitting device 100. If the performance result of afterimage compensation includes information indicating that afterimage compensation has been completed, step S619 may be omitted.

Upon receiving the afterimage compensation completion notification, the processor 190 may transmit a control command to the wireless receiving device 200 to cause the display 260 to display the afterimage compensation completion pop-up window 610.

Figure 6B:
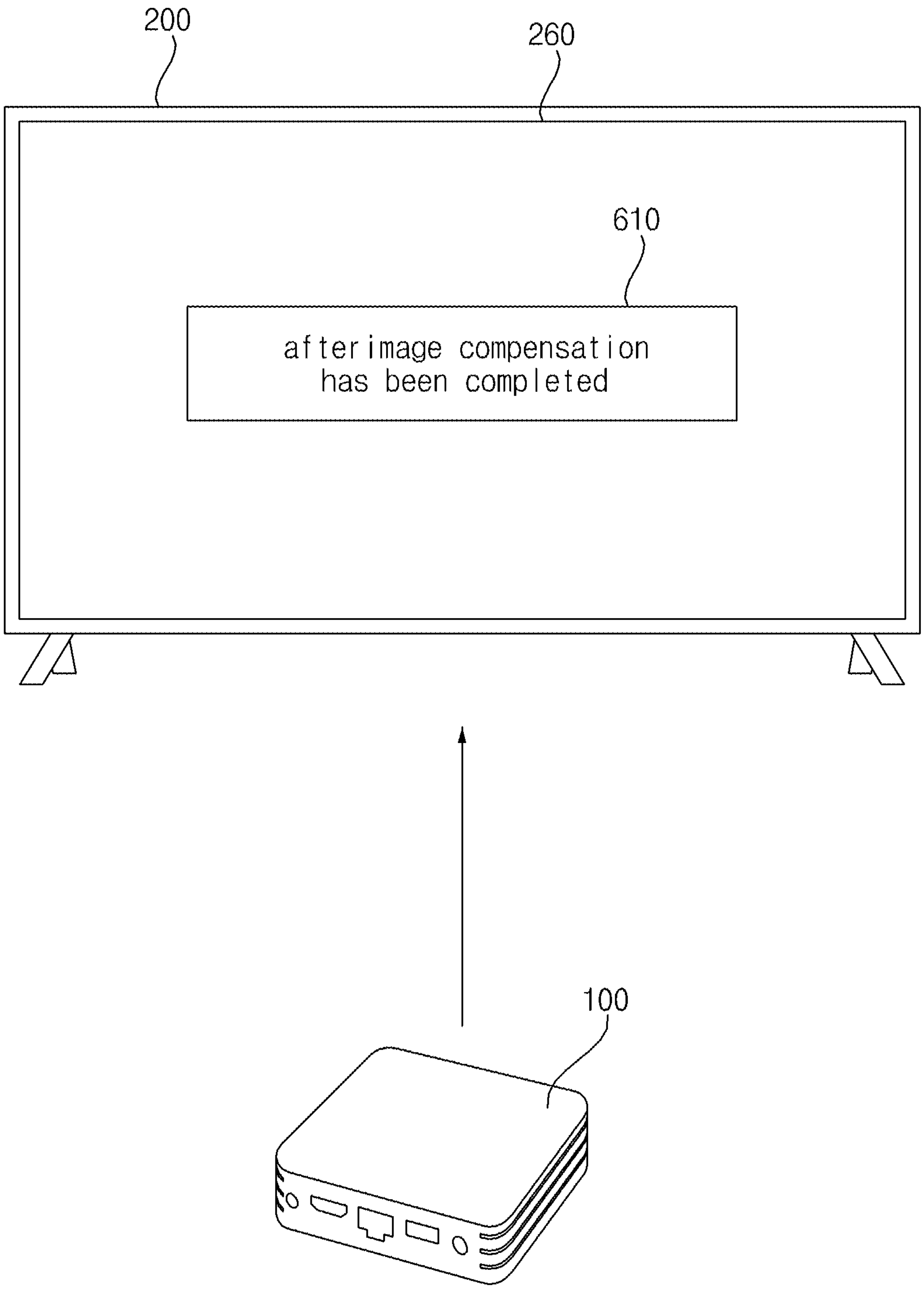
FIG. 6B is a diagram illustrating an example of displaying an afterimage compensation complete pop-up window according to an embodiment of the present disclosure.

FIG. 6B is a diagram illustrating an example of displaying an afterimage compensation complete pop-up window according to an embodiment of the present disclosure.

Referring to FIG. 6B, the wireless transmitting device 100 may transmit, to the wireless receiving device 200, a control command that causes the display 260 to display the afterimage compensation completion pop-up window 610 upon receiving the afterimage compensation completion notification from the wireless receiving device 200. The wireless receiving device 200 may display the afterimage compensation complete pop-up window 610 on the display 260 according to the received control command.

Again, FIG. 6A will be described.

Upon receiving the afterimage compensation completion notification, the processor 190 may transmit a screen off command to turn off the screen of the display 260 to the wireless receiving device 200. This is because the screen of the display 260 may be turned on for an afterimage compensation operation.

Figure 7A:
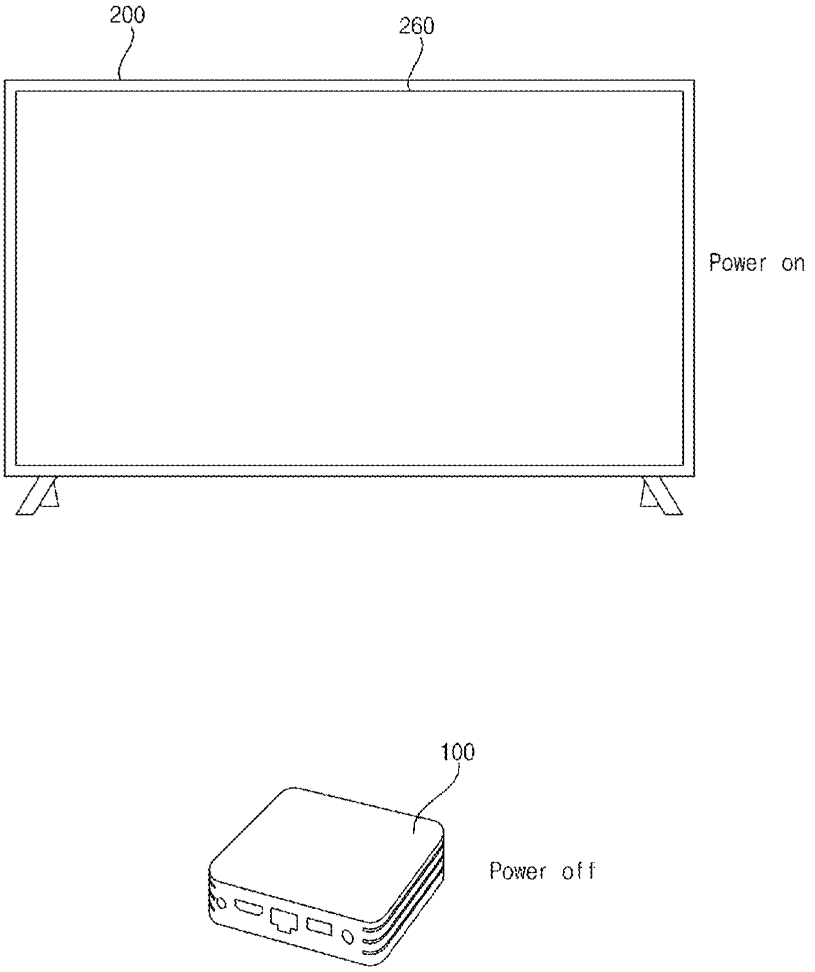
FIGS. 7A and 7B are diagrams illustrating a method for determining whether the embodiment of FIG. 6A has been applied.
Figure 7B:
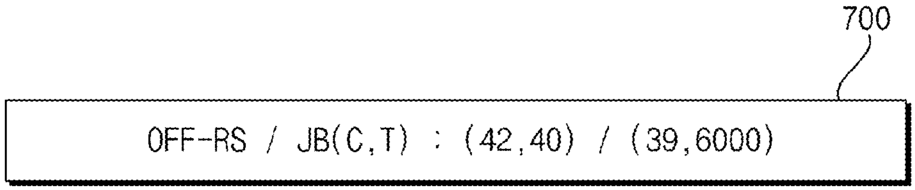

FIGS. 7A and 7B are diagrams illustrating a method for determining whether the embodiment of FIG. 6A has been applied.

In FIG. 7A, it is assumed that the display 260 of the wireless receiving device 200 is used for more than a preset time, and the screen of the display 260 is turned off.

Additionally, it is assumed that the power state of the wireless transmitting device 100 and the power state of the wireless receiving device 200 are temporarily out of sync with each other. This indicates that the wireless connection state is temporarily in the unstable state.

For example, the power of the wireless transmitting device 100 may be temporarily turned off, and the power of the wireless receiving device 200 may be turned on.

Afterwards, the user may turn on the wireless transmitting device 100. This is a situation where a temporary unstable state is converted to the normal connection state.

When the embodiment of the present disclosure is applied, since the wireless connection state has become in the normal connection state, the wireless transmitting device 100 may transmit an afterimage compensation execution command to the wireless receiving device 200 and the number of execution (C) and execution time (T) the afterimage compensation operation (OFF RS or JB) may be counted and increased. As shown in FIG. 7B, this may be confirmed through an afterimage compensation menu 700, which includes the execution number and execution time of the afterimage compensation operation.

According to an embodiment of the present disclosure, the above-described method may be implemented as processor-readable code on a program-recorded medium. Examples of media that the processor may read include ROM, RAM, CD-ROM, magnetic tape, floppy disk, and optical data storage device.

The invention claimed is:

1. A wireless transmitting device, comprising:

a RF (Radio Frequency) transmitting interface configured to communicates wirelessly with a wireless receiving device; and a processor configured to;

determine a wireless connection state between the wireless transmitting device and the wireless receiving device, and transmit, to the wireless receiving device, an afterimage compensation execution command for an afterimage compensation operation of a display of the wireless receiving device through the RF transmitting interface when the wireless connection state is determined to be a normal connection state and a usage time of the display of the wireless receiving device is more than a preset time.

2. The wireless transmitting device of the claim 1, wherein the processor does not transmit the afterimage compensation execution command to the wireless receiving device when the wireless connection state is a unstable state.

3. The wireless transmitting device of the claim 1, wherein the processor is further configured to:

re-check the wireless connection state during the afterimage compensation operation of the display, when the wireless connection state is the normal connection state, transmit an afterimage compensation completion confirmation command to the wireless receiving device to inquire whether the afterimage compensation operation of the display is completed.

4. The wireless transmitting device of the claim 3, wherein the processor does not transmit the afterimage compensation completion confirmation command to the wireless receiving device when the wireless connection state is in the unstable state.

5. The wireless transmitting device of the claim 3, wherein the processor is further configured to:

receive an afterimage compensation performance result from the wireless receiving device through the RF transmitting interface in response to the afterimage compensation completion confirmation command, wherein the afterimage compensation performance result includes one or more of whether the afterimage compensation operation is completed or an actual execution time at which the afterimage compensation operation of the display is actually performed.

6. The wireless transmitting device of the claim 5, wherein the processor is further configured to:

receive an afterimage compensation completion notification indicating that the afterimage compensation operation has been completed from the wireless receiving device through the RF transmitting interface.

7. The wireless transmitting device of the claim 6, wherein the processor is further configured to:

transmit a control command to the wireless receiving device to cause the display to display an afterimage compensation completion pop-up window upon receiving the afterimage compensation completion notification.

8. The wireless transmitting device of the claim 3, wherein the processor is further configured to:

re-check the wireless connection state when a performance time of the afterimage compensation operation reaches a preset compensation time.

9. A wireless display system including a wireless transmitting device and a wireless receiving device, wherein the wireless transmitting device is configured to:

determine a wireless connection state between the wireless transmitting device and the wireless receiving device, and transmit, to the wireless receiving device, an afterimage compensation execution command for an afterimage compensation operation of a display of the wireless receiving device through the RF transmitting interface when the wireless connection state is determined to be a normal connection state and a usage time of the display of the wireless receiving device is more than a preset time, wherein the wireless receiving device is configured to:

transmit an afterimage compensation start notification to the wireless transmitting device in response to the afterimage compensation execution command.

10. The wireless display system of claim 9, wherein the wireless transmitting device does not transmit the afterimage compensation execution command to the wireless receiving device when the wireless connection state is a unstable state.

11. The wireless display system of claim 9, wherein the wireless transmitting device is further configured to:

re-check the wireless connection state during the afterimage compensation operation of the display, when the wireless connection state is the normal connection state, transmit an afterimage compensation completion confirmation command to the wireless receiving device to inquire whether the afterimage compensation operation of the display is completed.

12. The wireless display system of claim 11, wherein the wireless transmitting device does not transmit the afterimage compensation completion confirmation command to the wireless receiving device when the wireless connection state is in the unstable state.

13. The wireless display system of claim 11, wherein the wireless transmitting device is further configured to:

receive an afterimage compensation performance result from the wireless receiving device through the RF transmitting interface in response to the afterimage compensation completion confirmation command, wherein the afterimage compensation performance result includes one or more of whether the afterimage compensation operation is completed or an actual execution time at which the afterimage compensation operation of the display is actually performed.

14. The wireless display system of claim 13, wherein the wireless transmitting device is further configured to:

receive an afterimage compensation completion notification indicating that the afterimage compensation operation has been completed from the wireless receiving device through the RF transmitting interface.

15. The wireless display system of claim 14, wherein the wireless transmitting device is further configured to:

transmit a control command to the wireless receiving device to cause the display to display an afterimage compensation completion pop-up window upon receiving the afterimage compensation completion notification.

* * * * *